US007778956B2

(12) United States Patent
Thirumalai et al.

(10) Patent No.: US 7,778,956 B2
(45) Date of Patent: Aug. 17, 2010

(54) PORTAL AND KEY MANAGEMENT SERVICE DATABASE SCHEMAS

(75) Inventors: Gokul P. Thirumalai, Redmond, WA (US); Munisamy Prabu, Issaquah, WA (US); Ashok Chandrasekaran, Redmond, WA (US); Zeyong Xu, Issaquah, WA (US); Curt Andrew Steeb, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 430 days.

(21) Appl. No.: 11/766,610

(22) Filed: Jun. 21, 2007

(65) Prior Publication Data

US 2008/0320024 A1 Dec. 25, 2008

(51) Int. Cl.
*G06F 7/00* (2006.01)
*G06F 17/00* (2006.01)
*G06F 17/30* (2006.01)

(52) U.S. Cl. .................. 707/602; 707/617; 707/802; 707/922

(58) Field of Classification Search .................. None
See application file for complete search history.

(56) References Cited

U.S. PATENT DOCUMENTS

| 5,689,697 | A | 11/1997 | Edwards et al. | |
|---|---|---|---|---|
| 6,138,143 | A | 10/2000 | Gigliotti et al. | |
| 7,043,498 | B2 | 5/2006 | McConnell et al. | |
| 2001/0019614 | A1 | 9/2001 | Madoukh | |
| 2002/0116485 | A1* | 8/2002 | Black et al. | 709/223 |
| 2002/0184340 | A1* | 12/2002 | Srivastava et al. | 709/219 |
| 2004/0039925 | A1 | 2/2004 | McMillan et al. | |
| 2004/0205048 | A1 | 10/2004 | Pizzo et al. | |
| 2005/0071344 | A1 | 3/2005 | Chen et al. | |
| 2005/0234936 | A1 | 10/2005 | Castro et al. | |
| 2005/0261058 | A1* | 11/2005 | Nguyen et al. | 463/40 |
| 2006/0107335 | A1 | 5/2006 | Frank et al. | |
| 2007/0074150 | A1 | 3/2007 | Jolfaei et al. | |
| 2007/0113284 | A1* | 5/2007 | O'Rourke et al. | 726/23 |

FOREIGN PATENT DOCUMENTS

| EP | 1659530 A1 | 5/2006 |
|---|---|---|
| WO | WO-2007032973 A1 | 3/2007 |

OTHER PUBLICATIONS

Trueblood et al., "Multi safe—a modular multiprocessing approach to secure database management," Oct. 1980, http://eprints.cs.vt.edu/archive/00000851/01/CS80008-R.pdf.
Damiani et al., "Key Management for MultiUser Encrypted Databases," AMC, 2005, http://delivery.acm.org/10.1145/1110000/1103792/p74-damiani.pdf?key1=1103792&key2=9742567711&coll=GUIDE&dl=Guide&CFID=17461795&CFTOKEN=36481919.
Hwang et al., "Asynchronous Transaction Commitment in Federated Database Systems," ftp://ftp.cs.umn.edu/dept/users/myriad/icpads.ps.Z.
"PostgreSQL," PostgreSQL Global Development Group, 2007, http://www.postgresql.org/docs/7.3/static/libpq-notify.html.
Written Opinion for PCT/US2008/067594 mailed Dec. 26, 2008.
International Search Report for PCT/US2008/067594 mailed Dec. 26, 2008.

* cited by examiner

*Primary Examiner*—Mohammad Ali
*Assistant Examiner*—Kannan Shanmugasundaram
(74) *Attorney, Agent, or Firm*—Marshall, Gerstein & Borun LLP (57) ABSTRACT

In a pay-per-use computer environment, particularly when network access is limited, self-monitoring tools on a pay-per-use computer may require special support from a host/server. The host/server must be able to respond to requests quickly and efficiently and yet maintain full information required to service requests and updates. A key management table and a device management table provide critical information required to service requests. Use of SQL notifications allows local database caches to remain current but quickly accessible.

2 Claims, 8 Drawing Sheets

Enumeration — 422

| Column Name | Data type | Nullable |
|---|---|---|
| Id | int | No |
| Type | nvarchar(25) | No |
| Name | nvarchar(50) | No |
| Description | nvarchar(256) | No |

427 — Id
428 — Type
429 — Name
430 — Description

HLMKey — 424

| Column Name | Data type | Nullable |
|---|---|---|
| Id | int | No |
| PartnerCode | nchar(5) | No |
| PartnerName | nvarchar(50) | No |
| PrivateKey | varbinary(MAX) | No |
| PublicKey | varbinary(MAX) | No |
| Status | int | No |
| Description | nvarchar(256) | Yes |

431 — Id
432 — PartnerCode
433 — PartnerName
434 — PrivateKey
435 — PublicKey
436 — Status
437 — Description

Key — 426

| Column Name | Data type | Nullable |
|---|---|---|
| Id | int | No |
| KeyData | varbinary(MAX) | No |
| KeyHash | binary(32) | No |
| Status | int | No |
| KeyMetadataID | int | No |

438 — Id
439 — KeyData
440 — KeyHash
441 — Status
442 — KeyMetadataID

KeyMetadata table
(Fig. 4D)

PORTAL AND KEY MANAGEMENT SERVICE DATABASE SCHEMAS

BACKGROUND

Pay-as-you-go or pay-per-use business models have been used in many areas of commerce, from cellular telephones to commercial laundromats. In developing a pay-as-you go business, a provider, for example, a cellular telephone provider, offers the use of hardware (a cellular telephone) at a lower-than-market cost in exchange for a commitment to remain a subscriber to their network for a period of time. In this specific example, the customer receives a cellular phone for little or no money in exchange for signing a contract to become a subscriber for a given period of time. Over the course of the contract, the service provider recovers the cost of the hardware by charging the consumer for using the cellular phone.

In the case of the cellular telephone, all charges are billed, mediated, and accrued on the network side. Even a pre-paid user account has value, in terms of minutes or text messages, stored on the network and a local SIM card for identifying the phone/account to the network. Because the phone is essentially useless unless connected to the network, the model works.

However, unlike a cellular telephone, a pay-per-use computer may have substantial value to a user even though only occasionally connected to a network. Therefore, the computer must be able to meter and monitor its own operation with only infrequent access to a network host. While potential lack of access places a significant security burden on the computer to fairly meter usage, it also requires special consideration at the network end. Because a network server and the pay-per-use computer may only have occasional, and sometimes brief contact with each other, the network server must be able to respond quickly and correctly to requests from the computer. Likewise, requests from customer service or a repair facility must be coordinated so that correct information is available in a timely manner. Underlying all communication and metered-use activity is a security core based on cryptographic principals which brings its own requirements.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A web portal supporting a pay-per-use computer business model and an underlying database may use tailored schemas to support such tasks as request processing and key management. The portal schema may include a device schema with a request table and a key management schema that supports a number of tables corresponding to cryptographic requirements for specific portions of the product life cycle such as a manufacturer table and an account table. A local cache of system data relating to devices and key management may be used for speed and security reasons. The local cache may use a SQL notification service to maintain data of interest in the local cache, even when a request is not being processed. The SQL notification service keeps a list of data maintained in a local cache and sends a notification to the local cache when any of the locally-maintained data elements change. The local cache system may then update the data as required. Because the local cache is fresh, requests may be processed locally without waiting for a data verification check.

DETAILED DESCRIPTION

Although the following text sets forth a detailed description of numerous different embodiments, it should be understood that the legal scope of the description is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '________' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Much of the inventive functionality and many of the inventive principles are best implemented with or in software programs or instructions and integrated circuits (ICs) such as application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. Therefore, in the interest of brevity and minimization of any risk of obscuring the principles and concepts in accordance to the present invention, further discussion of such software and ICs, if any, will be limited to the essentials with respect to the principles and concepts of the preferred embodiments.

Figure 1:
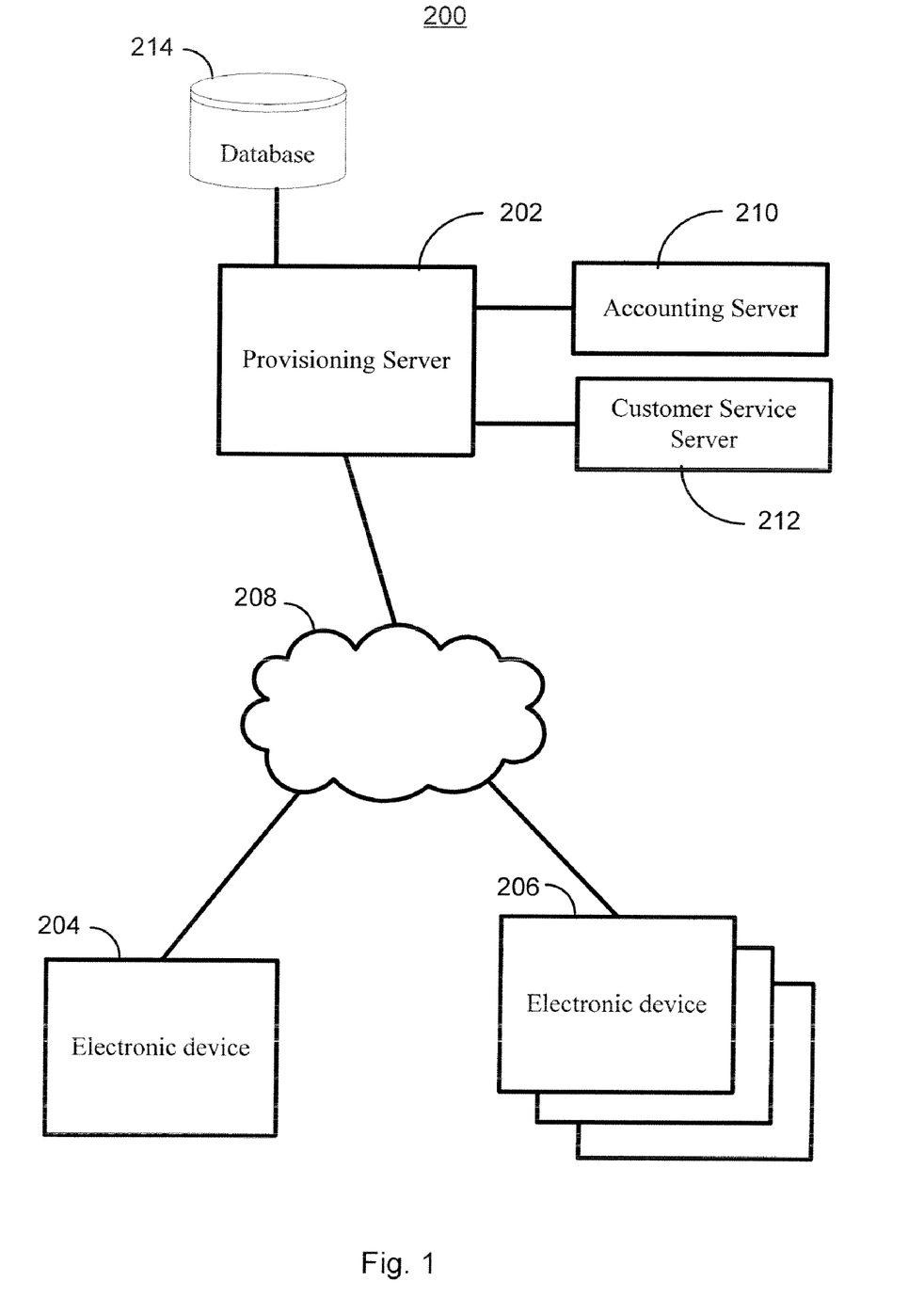
FIG. 1 is a simplified and representative block diagram of a system supporting a pay-as-you-go business model.

FIG. 1 illustrates a representative system 200 supporting a pay-per-use business model. A provisioning server 202 may be coupled to an accounting server 210 where account balances may be maintained, as well as connections to individual subscriber's funding accounts (not depicted), when used. A network 208, such as the Internet may couple the provisioning server 202 to one or more electronic devices 204, 206. The link between the provisioning server 202 and the accounting server 210 and related sites, may also be via the network 208. The electronic devices 204, 206, may be pay-per-use or metered-use computers, that is, the electronic devices may be self-monitoring and self-enforcing devices, capable of managing one or more usage mode, such as prepaid use using locally stored value. The operation modes may include metered use, that is, local payment made according to a metric such as time duration or resource use (e.g. cpu cycles). Other modes may include subscription use with use allowed until an expiration date/time. Other modes, or combinations of these may also be supported. Postpaid usage may also be supported in some business models, with the value of use accumulated and settled during periodic connection to the provisioning server 202. In each case, communication with the provisioning server 202 may be occasional, at best, although a minimum level of communication may be mandated.

Should the electronic device 204, 206 wish to continue operation, connection to the provisioning server may be initiated and a request for additional usage forwarded. Time synchronization may be required to help prevent fraudulent subscription or metering use caused by local clock manipulation. The electronic device 204, 206 may also include a protected subsystem to manage metering, stored value, and policy enforcement. The latter being the ability of the electronic device 204, 206 to place itself in a limited operation mode when terms of use are not satisfied, such as low local stored value, or detection of tampering.

The provisioning server 202 may also be coupled to a customer service server 212 that may support one or more customer service representatives or even a web-based support feature (not depicted). A database 214 run from the provisioning server may maintain local data, such as information about the status of downloads to the one or more electronic devices 204, 206, but may also include cached data from the accounting server 210, the customer service server 212, or both.

Figure 2:
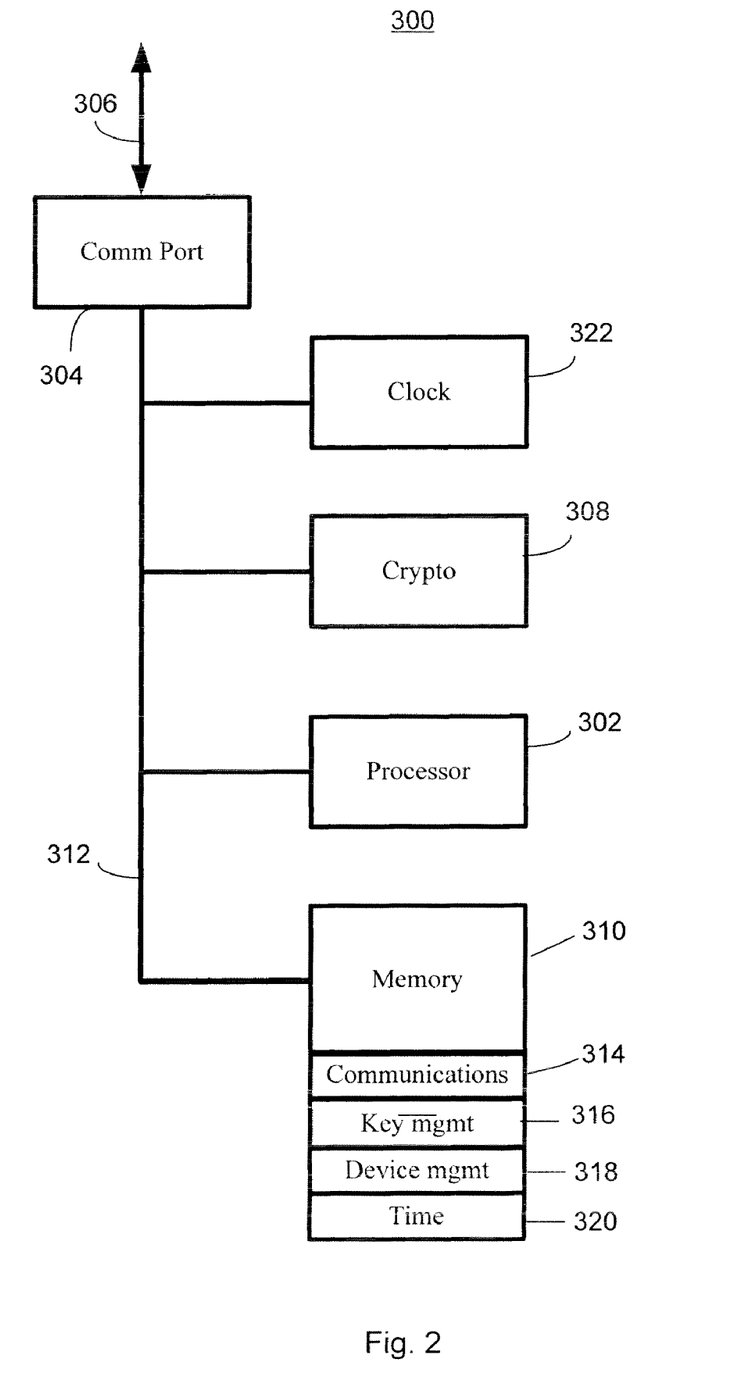
FIG. 2 is a simplified and representative block diagram of a provisioning server of FIG. 1.

Turning briefly to FIG. 2, an exemplary block diagram of a server 300, similar to the provisioning server 202 of FIG. 1 is discussed and described. The provisioning server 300 may include a processor 302 and a communication port 304 for communication over network link 306. The provisioning server 300 may also include memory 310. The memory 310 may be any combination of volatile and non-volatile memory, such as random access memory (RAM), read-only memory (ROM), rotating media, flash memory, etc. The memory 310 may be used by the processor to store settings and use for intermediate results. The memory 310 may also be used to store computer-executable instructions that may include executable program modules for communication 314, key management 316, device management 318, and time keeping 320.

The key and device management functions 316, 318 are discussed in more detail below, but briefly, may be executed as required for building and using the key and device schemas for the administration of the pay-per-use computers.

The provisioning server 300 may also include a clock 322 for use with the time keeping module 320 for subscription management and time-based metering. A cryptographic function 308 may be used to support a variety of security purposes, including message authentication, encryption, and public key infrastructure (PKI) support.

Returning to FIG. 1, in operation, one of the electronic devices 204 may require service, either upon initial installation or as a result of a request to add more usage time. The request may be forwarded to the provisioning server 202 and the database 214 may be checked for current status using a request table from the device schema. The database, even though largely a mirror of data sourced from other systems, for example, the accounting 210 or customer service 212 servers may be kept up to date via a SQL notification process that notifies the database 214 when information on in the source changes.

The provisioning server may create an packet for transmission to the electronic device 204 after processing the request, for example, by debiting funds from a user account. The provisioning server 202 may be required to send the data for signing. While in the signature process, the database may also query and update a key management schema to extract appropriate keys qualifying the data in the packet. In one embodiment, keys may be based on a combination of underwriter identity, the identity of the electronic device 204, and the pay-per-use options contracted for that electronic device 204. The key management schema may allow direct generation of the required keys, or may send indexes to an external cryptographic function, such as a hardware security module for packet signing. The key management schema may update elements, such as any rolling codes used in the system 200.

After the packet has been created and signed, the provisioning server 202 may deliver the packet to the electronic device 204. Delivery confirmation may be tracked and re-tries processed as required, up to a non-delivery limit. After confirmation of delivery, the device schema may be updated to reflect the most recent transaction.

Figure 3:
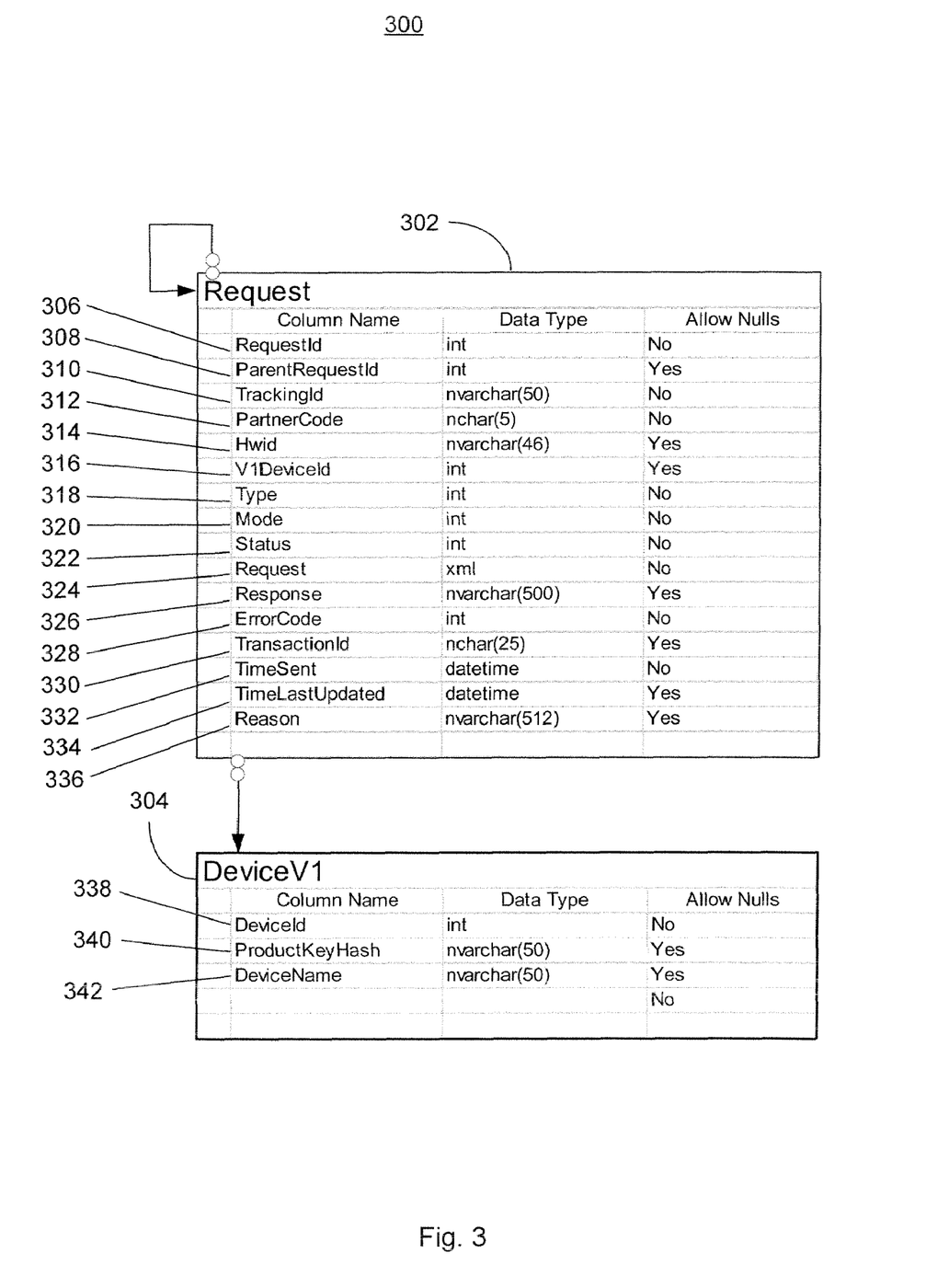
FIG. 3 is an exemplary device schema.

FIG. 3 illustrates an exemplary device schema 300. The device schema 300 may include a request table 302 and a device table 304. The request table 302 may include various fields summarized in Table 1 below. Reference numbers to FIG. 3 are shown in parentheses ( ), exemplary field widths are in braces [ ].

TABLE 1

Request Table (302, FIG. 3)

| Column Name | Data Type | Allow Null | Description |
| --- | --- | --- | --- |
| RequestId (306) | int | No | Primary key. Automatically generated. |
| ParentRequestId (308) | int | Yes | If child of BatchRequest, this contains the parent batch Id. |
| TrackingId (310) | Nvarchar[50] | No | Universally unique identifier of the batch request. Note it is different from the BatchId. |

TABLE 1-continued

Request Table (302, FIG. 3)

| Column Name | Data Type | Allow Null | Description |
| --- | --- | --- | --- |
| PartnerCode (312) | Nchar[5] | No | The Partner Code assigned to the partner by the scheme owner. |
| Hwid (314) | Nvarchar[46] | Yes | Hardware_Id identifying the client device. |
| V1DeviceId (316) | Int | Yes | If a legacy device, index into the legacy device table. |
| Type (318) | int | No | Identifies the type of request. Request types may include ProvisionDevice, HLMUnlock, PerpetuateDevice, etc. |
| Mode (320) | Int | No | Identifies whether this is a CSR operation or a Batch operation. |
| Status (322) | int | No | The status for the batch. It must be in one of the following state:<br>1. New: the batch is created and not sent.<br>2. Sent: the batch is sent to and acknowledged by the server and no BatchResponse received yet.<br>3. Succeed: BatchResponse received and all requests in the batch are handled successfully.<br>4. Failed: BatchResponse received and one or more requests in the batch are failed.<br>5. SendFailed: There was an error processing the request before sending to server. The request failed.<br>6. Pending: the batch is pending processing at the server.<br>Since this table stores batch as well as individual request information, this also stores statuses of individual requests. The individual request statuses map directly to those received from the server. |
| Request (322) | Xml | No | Actual Request XML that was sent |
| Response (324) | Nvarchar[500] | Yes | Response received from the server |
| ErrorCode (328) | Int | No | Stores errorCode information if any that is associated with this request. |
| TransactionId (330) | Nchar[25] | Yes | Metadata associated with transaction |
| TimeSent (332) | Datetime | No | The time when the batch is sent successfully to the server. This is used to sort the bulk operation history. |
| TimeLastUpdated (334) | Datetime | Yes | The time when the batch is updated with the latest batch response. |
| Reason (336) | Nvarchar[512] | Yes | Reason metadata associated with batch or request. Reasons may include initial load, update clock, adjustments for customer satisfaction, purchase of time, etc. |

Batch operations may include those requested by a manufacturer, such as initializing a set of new electronic devices. Individual requests may include requests for additional usage time, clock verification, and reconfiguration.

Legacy operations with devices from prior versions may require additional data for compatibility. The device table 304 may include those fields. A representative device table is illustrated in Table 2.

TABLE 2

DeviceV1 Table (304)

| Column Name | Data Type | Allow Null | Description |
| --- | --- | --- | --- |
| DeviceId (338) | int | No | Primary key. Automatically generated. |
| ProductKeyHash (334) | bigint | Yes | The double hashed Windows product key associated with the legacy device. |
| DeviceName (336) | Nvarchar[50] | Yes | Unique DeviceName to identify the legacy device. |

Figure 4A:
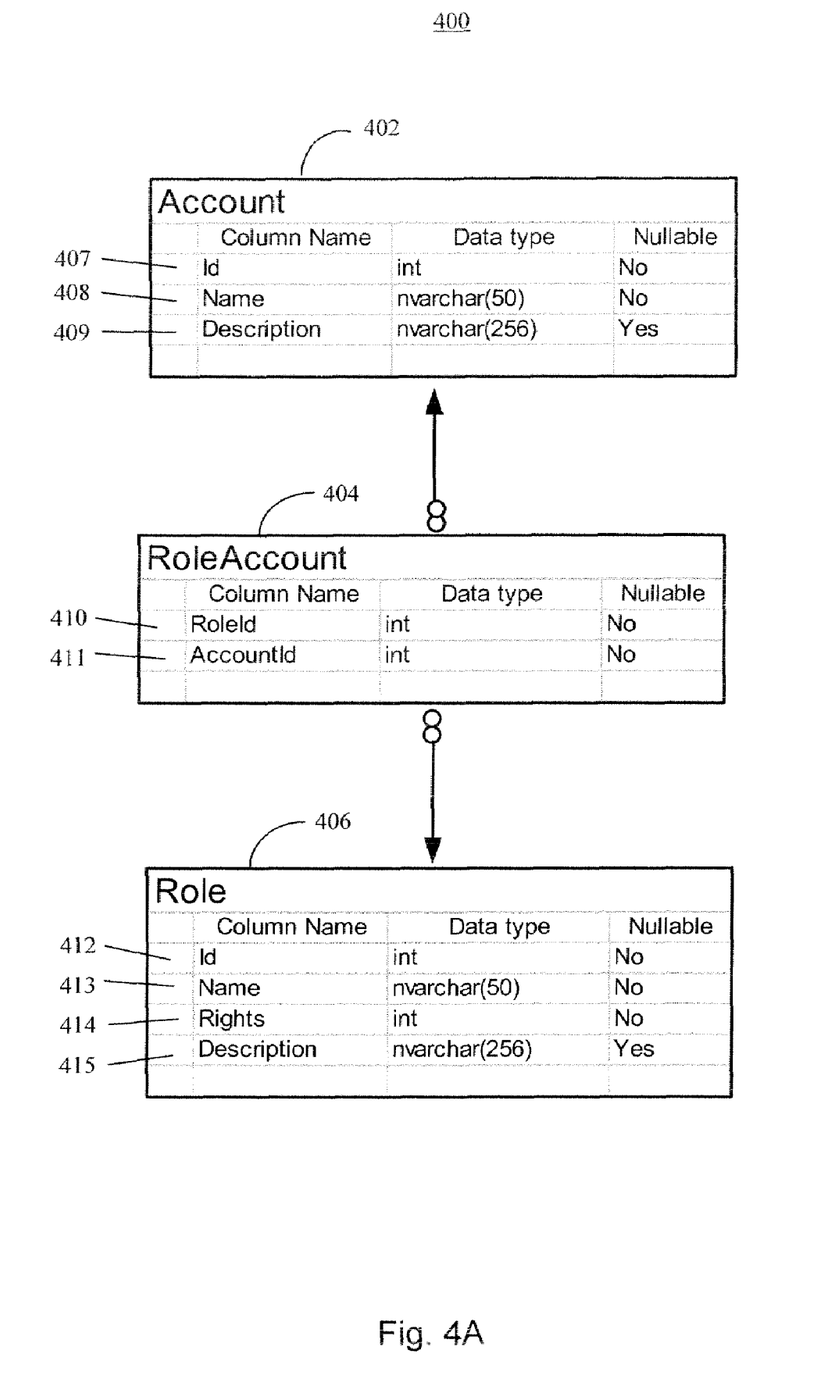
FIG. 4A is a first portion of an exemplary key management schema.

FIG. 4A is a portion of a representative key management schema 400. The key management schema may include one or more of the following tables, or their functional equivalents: an account table 402 a role_account table 404, and a role table 406. Each of the tables and representative fields are shown and described in Tables 3-5. As above, reference designators corresponding to FIG. 4A are in parenthesis ( ), representative field widths, when appropriate, are in braces [ ].

TABLE 3

RoleAccount Table (404, FIG. 4A)

| Column Name | Data Type | Nullable | Description |
| --- | --- | --- | --- |
| RoleId (410) | int | No | Primary Key; Role Idenifier of associated table for many to many relationships. |
| AccountId (411) | Int | No | Primary Key; Account identifier of associated table for many to many relationships. |

TABLE 4

Account Table (402)

| Column Name | Data Type | Nullable | Description |
| --- | --- | --- | --- |
| Id (407) | int | No | Primary Key; Automatically generated. |
| Name (408) | Nvarchar[50] | No | Name of Windows account that service or tool impersonates. |

TABLE 4-continued

Account Table (402)

| Column Name | Data Type | Nullable | Description |
| --- | --- | --- | --- |
| Description (409) | Nvarchar[256] | Yes | Description about the Account. |

TABLE 5

Role Table (406)

| Column Name | Data Type | Nullable | Description |
| --- | --- | --- | --- |
| Id (412) | int | No | Primary Key; Automatically generated. |
| Name (413) | Nvarchar[50] | No | Name of Role; CoreService | Distribution | Customer service | Key Generation |
| Rights (414) | Int | No | Rights to invoke Key Management Service interface methods expressed as bit map. |
| Description (415) | Nvarchar[256] | Yes | Description about the Role. |

Figure 4B:
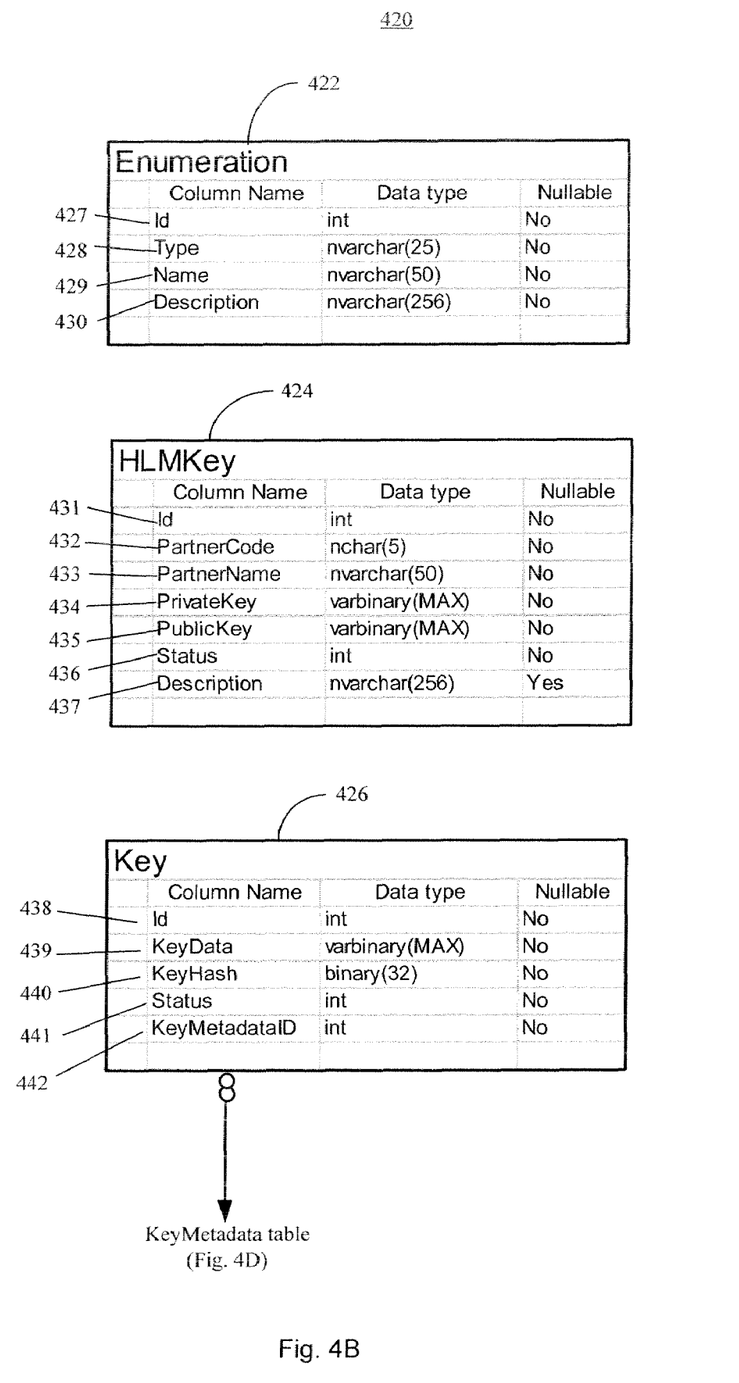
FIG. 4B is second portion of an exemplary key management schema.

FIG. 4B is a portion of a representative key management schema 420. The key management schema may include one or more of the following tables, or their functional equivalents: an enumeration table 422, a lock mode table 424, a key table 426. Each of the tables and representative fields are shown and described in Tables 6-8. As above, reference designators corresponding to FIG. 4B are in parenthesis ( ), representative field widths are in braces [ ].

TABLE 6

Enumeration Table (422, FIG. 4B)

| Column Name | Data Type | Nullable | Description |
| --- | --- | --- | --- |
| EnumId (427) | Int | No | Primary key, it is the number of the enumeration value. It is unique crossing all of the enumeration types. |
| Type (428) | nvarchar[25] | No | The enumeration type such as KeyStatus, DeviceStatus. |
| Name (429) | nvarchar[50] | No | The name of the enumeration value. |
| Description (430) | Nvarchar[256] | Yes | Brief description of the enumeration value. |

TABLE 7

HLMKey Table (424)

| Column Name | Data Type | Nullable | Description |
|---|---|---|---|
| Id (431) | Bigint | No | Primary Key; Automatically generated. |
| PartnerCode (432) | Nchar[5] | No | Code that uniquely identifies the Partner. |
| PartnerName (433) | Nvarchar[50] | No | Name of the partner. |
| PrivateKey (434) | varbinary[MAX] | No | Lock mode Private key stored as encrypted blob. |
| PublicKey (435) | varbinary[MAX] | No | Lock mode Public key stored as encrypted blob. |
| Status (436) | Int | No | Status of the Lock Mode Key - Active \| Inactive Need to enforce only one Active Lock Mode Key per partner. |
| Description (437) | Nvarchar[256] | Yes | Description about the Lock Mode Key. |

TABLE 8

Key Table (426)

| Column Name | Data Type | Nullable | Description |
|---|---|---|---|
| KeyId (438) | Int | No | Primary Key; Automatically generated. |
| KeyData (439) | varbinary[MAX] | No | Master Key as encrypted string. |
| KeyHash (440) | Binary[32] | No | SHA 256 hash of Master Key [without encryption]. Since UNIQUE constraint cannot be applied to KeyData column, UNIQUE constraint is applied on this column. |
| Status (441) | Int | No | Status of the Key - In Use; Deprecated |

Figure 4C:
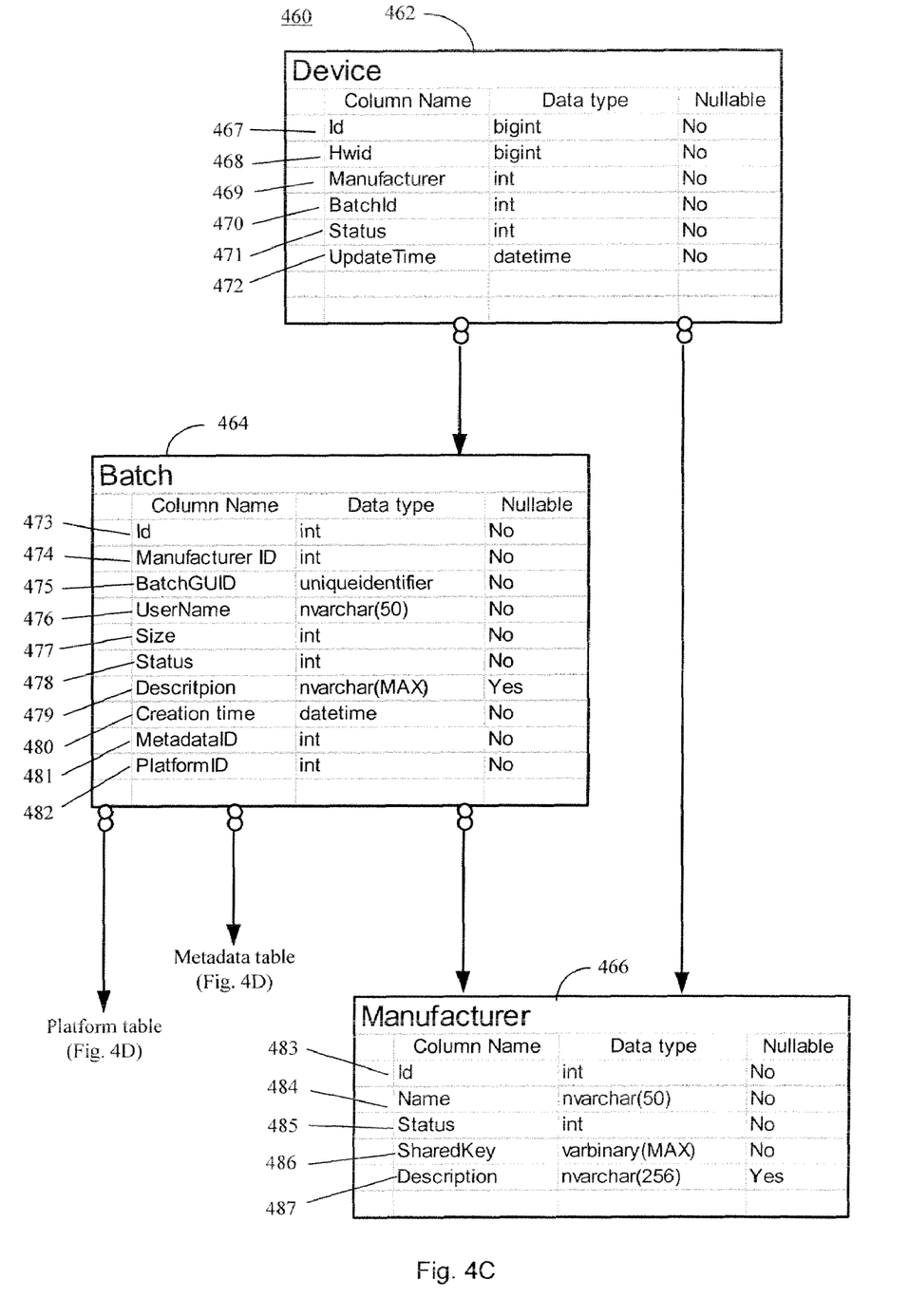
FIG. 4C is a third portion of an exemplary key management schema.

FIG. 4C is a portion of a representative key management schema 460. The key management schema may include one or more of the following tables, or their functional equivalents: a device table 462, a batch table 464, and a manufacturer table 466. Each of the tables and representative fields are shown and described in Tables 9-11. As above, reference designators corresponding to FIG. 4C are in parenthesis ( ), representative field widths are in braces [ ].

TABLE 9

Device Table (462, FIG. 4C)

| Column Name | Data Type | Nullable | Description |
|---|---|---|---|
| DeviceId (467) | Bigint | No | Primary Key; Automatically generated. |
| Hwid (468) | Bigint | No | Unique hardware identifier built in device module. It must be unique in the table. It is 64 bit data with the following format: Platform data - 8 bits Version Info (Metadata ID) - 8 bits Test/Production - 1 bit Reserved - 4 bits Assigned Portion - 48 bits |
| ManufacturerId (469) | Int | No | Manufacturer identifier; Foreign key connecting to Manufacturer table. |
| BatchId (470) | Int | No | Batch identifier Foreign Key connecting to Batch table. |
| Status (471) | Int | No | Status of the device - Created \| Registered |
| UpdateTime (472) | Datetime | No | Timestamp at which device info is updated. |

TABLE 10

Batch Table (464)

| Column Name | Data Type | Nullable | Description |
|---|---|---|---|
| Id (473) | bigint | No | Primary Key; Automatically generated. |
| ManufacturerId (474) | int | No | Manufacturer identifier; Foreign key connecting to Manufacturer table. |
| BatchGUID (475) | int | No | Batch global unique identifier. |
| UserName (476) | nvarchar[50] | No | Windows Security principal name of user that added this entry, for auditing purposes. |
| Size (477) | Int | No | Size of the batch; Total number of hardware identifiers and Key data to generate. |
| Status (478) | int | No | Status of the device - Created; Registered |
| Description (479) | Nvarchar[MAX] | Yes | Description of the batch operation. Subsequent task details on the same batch get appended to provide the history of tasks. |
| CreationTime (480) | datetime | No | Timestamp at which Batch is created. |

TABLE 11

Manufacturer Table (466)

| Column Name | Data Type | Nullable | Description |
|---|---|---|---|
| Id (481) | Int | No | Primary Key; Automatically generated. |
| Name (482) | Nvarchar[50] | No | Name of manufacturer. Server owner is also added as one partner to support varying requirements from chip manufacturers. |
| SharedKey (483) | Variable length binary[MAX] | No | Shared key issued to every manufacturer. It is used to transfer the device symmetric keys - Hardware identifier data file encrypted with this shared key. |
| Status (484) | int | No | Status of the manufacturer - Active; Disabled |
| Description (485) | Nvarchar[256] | Yes | Description of the manufacturer. |

Figure 4D:
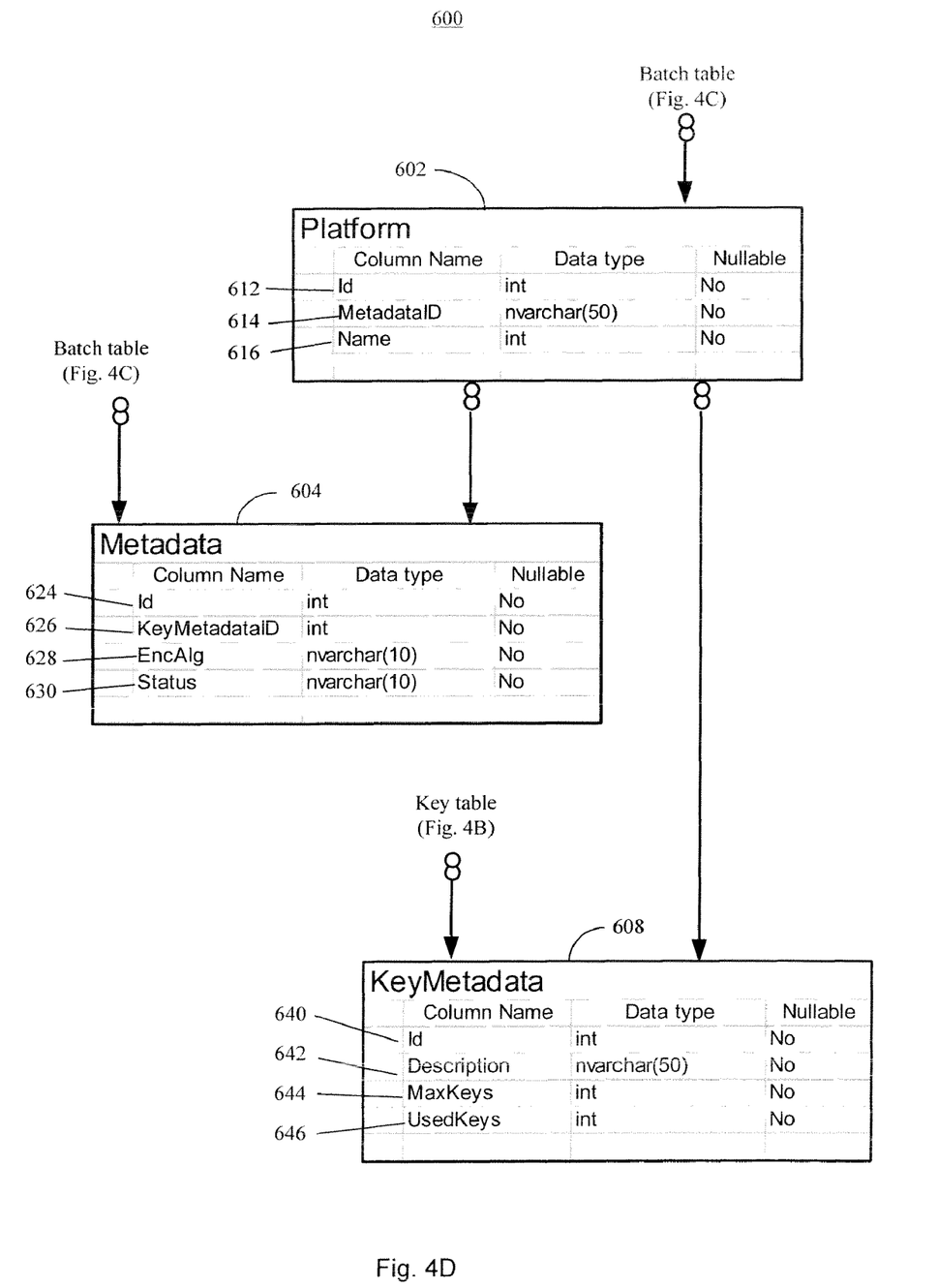
FIG. 4D is a fourth portion of an exemplary key management schema.

FIG. 4D is an additional portion of a representative key management schema 460. The key management schema may include one or more of the following tables, or their functional equivalents: a metadata table 604, a platform table 602, and a KeyMetadata table 606. Each of the tables and representative fields are shown and described in Tables 12-14. As above, reference designators corresponding to FIG. 4C are in parenthesis ( ), representative field widths are in braces [ ].

TABLE 12

Metadata Table (604, FIG. 4D)
The metadata is used for versioning the devices and this is added to the highest order bit in the hwid.

| Column Name | Data Type | Nullable | Description |
|---|---|---|---|
| Id (624) | int | No | PrimaryKey: This is the versioning information added to the highest order byte of the hwid |
| KeyMetaDataId (626) | Int | No | The key set to be used for this version |
| EncAlg (628) | NVARCHAR[10] | No | This field is reserved |
| Status (630) | NVARCHR[10] | No | This field is reserved |

TABLE 13

Platform Table (602)
The Platform table is used to define the platform of the hardware. This is mainly for informational purposes and key management uses this for mapping the metadata Id alone for that platform. This metadataId associated with a platform can be changed at any time. This is inserted into the first four bits of the second highest order bits of the hwid.

| Column Name | Data Type | Nullable | Description |
|---|---|---|---|
| Id (612) | int | No | PrimaryKey: This is the identifier and is inserted into the hwid |
| MetaDataId (614) | Int | No | The versioning associated with the platform |
| Name (616) | NVARCHAR[50] | No | The name of the platform |

TABLE 14

KeyMetadata Table (608)
This table enables grouping of the keys into sets of keys and defines the maximum number of keys that are allowed for the set of keys and the number of used keys from the set of keys.

| Column Name | Data Type | Nullable | Description |
|---|---|---|---|
| Id (640) | int | No | Primary Key |
| Description (642) | NVARCHAR[50] | No | A description of the set of keys |

TABLE 14-continued

KeyMetadata Table (608)
This table enables grouping of the keys into sets of keys and defines the maximum number of keys that are allowed for the set of keys and the number of used keys from the set of keys.

| Column Name | Data Type | Nullable | Description |
| --- | --- | --- | --- |
| MaxKeys (644) | Int | No | The group hash modulus used for the keys |
| UsedKeys (646) | int | No | The number of keys from the sequential set of keys to be used. |

Figure 5:
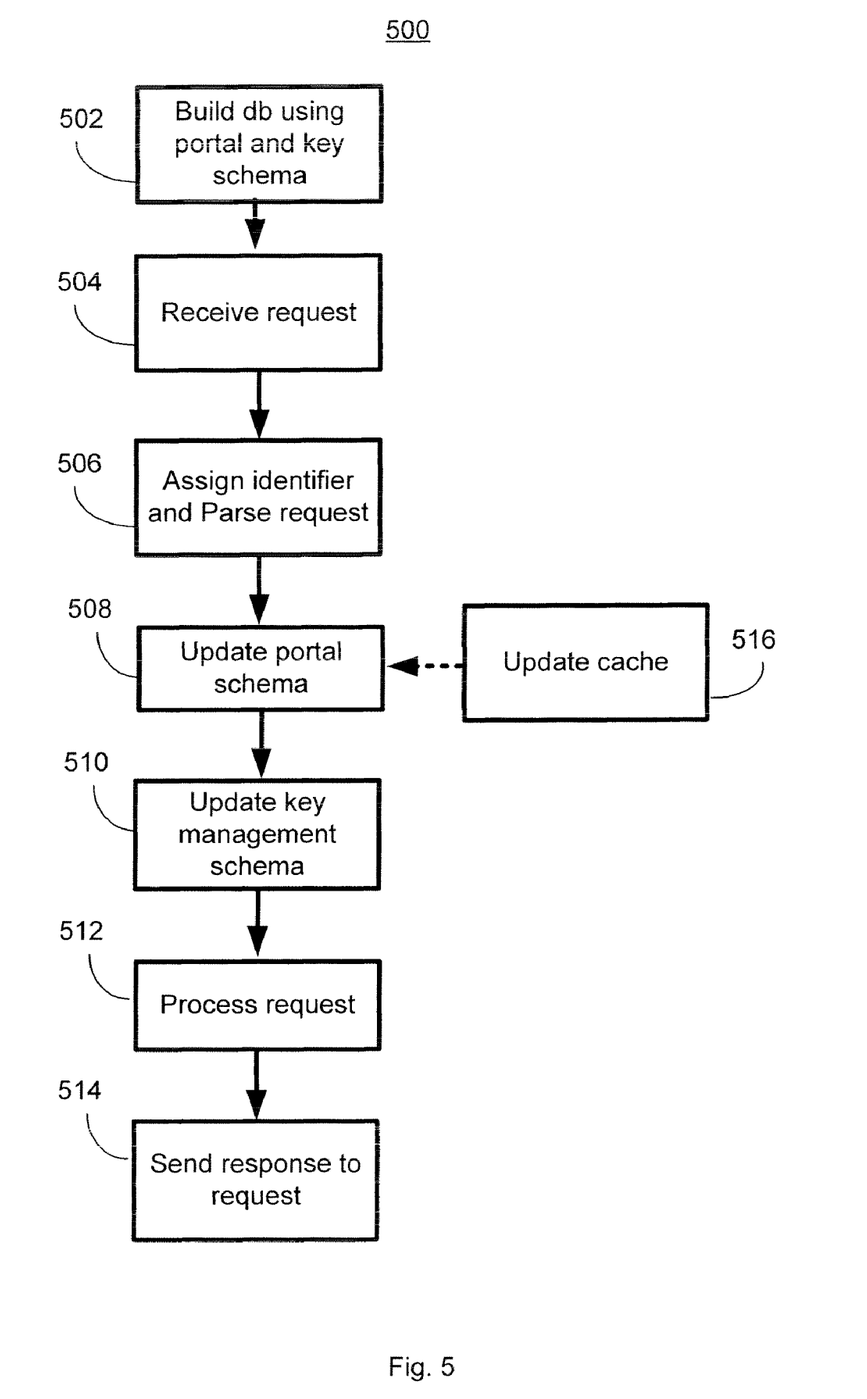
FIG. 5 is a method of operating a pay-per-use computer system portal.

FIG. 5 illustrates an exemplary method 500 of using portal and database schemas in the operation of a pay-per-use computer system portal. The portal and key management schemas allow fast and secure responses to be developed for requests relating to target pay-per-use devices, whether the request is initiated by customer service, the scheme owner, or the pay-per-use device itself. For both speed and security reasons, it is useful to use a local cache of the pay-per-use database information when generating responses. A capability known as SQL notification can be used to maintain fresh data in a local cache so that delays related to refreshing the cache are minimized.

At block 502, a database may be built using portal and key management schemas to support portal activity related pay-per-use computers. Individual instances of the schema may be created for each pay-per-use device and each host device, as needed. The portal schema may include a first device table and a request table, a request ID field as a key index, and a partner code defining a supplier of the pay-per-use computer. Building the portal schema may also include building the first device table to include a status field corresponding to one of a batch and an individual request, the status field having a value being one of new, sent, succeed, failed, send_failed, and pending.

Building the key management schema may include generating a number of related tables corresponding to secure management of data and communications for the scheme owner, supplier partners, distribution channel partners, maintenance partners, and end-user devices. The key management schema may include a key table, a second device table, an enumeration table and a manufacturer table. Building the key management schema may also include building the key table to include a primary index field, a master key field, a key hash field, and a key status field. The key management schema may also include a second device table to include a device index field, a hardware identifier field, a first manufacturer index field, and a device status field. Building the key management schema may further include building the manufacturer table to include a shared key field, a manufacturer status field, and a second manufacturer index field linked to the first manufacturer index field of the second device table. Building the key management schema may include building the enumeration table to include an enumeration index field and a type field supporting key status or device status, and an enumeration value field.

A block 504, a request may be received for a specific action related to a pay-per-use computer. The request may include registration requests from a channel partner, may include a usage time adjustment request from a customer service representative, or may include a time synchronization request or a add-time request. The portal may be a web site supporting web services for receiving and responding to the request. The request, in one embodiment, may be an XML (extensible markup language) format request that corresponds to the pay-per-use or metered-use computer. The request may include device data, key data, or both.

When the request is from a customer service source, the request may include metadata related to the reason for the request, such as, an adjustment due to a recent payment or for customer satisfaction, or a change in subscription terms.

At block 506, the request may be assigned an identifier and data in the request parsed according to pre-determined criteria, such as an Extensible Stylesheet Language (XSL) definition. Parsing the request may include determining a partner identifier, determining a hardware identifier, and determining when the request corresponds to a single electronic device or if the request is a child of a related batch request.

At block 508, the portal schema may be updated, including updating or creating table entries corresponding to the request. For example, in one embodiment, a request table may be populated with data from the request, including the assigned identifier and a related parent request, when appropriate. The request table may be further populated with a tracking identifier and a partner code, if the request is related to a supplier of hardware or software available at the electronic device, while a hardware identifier may uniquely identify the physical device in question. A request type may indicate the type of request. If a batch request, mode and status fields may be populated or updated as the batch request is processed.

At block 510, a database instance according to the key management schema may be created or populated. An account, role_account, and role tables may be used to identify and determine the ability of the requester to make such a request. An enumeration table may be used to list transient data such as the device or key status. A lock mode table (also called a hardware lock mode, or HLM, key table) may indicate whether the electronic device associated with the request is currently locked due to low value or tampering. Key, device and manufacturer tables may be referenced to determine the nature and status of the device and its associations with partners.

At block 512, the request may be processed. In some embodiments, a local cache may be maintained to allow faster servicing of requests. For example, an add value request may reference the current status of the electronic device, status of the user's account (e.g. in good standing), and validity of the current local time at the electronic device. When a value is not available from the local cache, a host request may be made. If the local cache has a value it may be used. In some cases, even a local value may be checked if it is 'stale,' that is, older than a metric for renewal. In other embodiments, a SQL notification 516 may be used to update the cache when the host recognizes a change has been made to data in the local cache. The new value may be pushed out, or, in some cases, a notification may be sent and the local cache may be updated only if the data is needed.

Processing the request may include updating any of the associated portal and key management tables. From the portal and key management tables, a response may be generated, for example, an XML response.

At block 514, the response may be sent to the requesting party. Alternatively, in some cases, such as a customer service request, the response may be directed to the electronic device associated with the request, with only a confirmation being returned to the requesting device.

The administration of pay-per-use electronic devices, including metered-use computers and the like, using a web-services portal requires special considerations for security and responsiveness. The use of the portal and key management schemas as described above allows those mutual goals to be achieved. XML notification for cache refreshing also adds to responsiveness and customer satisfaction.

Although the forgoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims.

Thus, many modifications and variations may be made in the techniques and structures described and illustrated herein without departing from the spirit and scope of the present claims. Accordingly, it should be understood that the methods and apparatus described herein are illustrative only and are not limiting upon the scope of the claims.

The invention claimed is:

1. A computer-readable storage medium tangibly embodying a program of instruction executable by a computer, wherein the program of instruction comprises a method of responding to a request for service corresponding to a metered-use computer, the method comprising:
    receiving an XML request corresponding to use of the metered-use computer;
    assigning a request identifier;
    determining a partner identifier defining a supplier of the metered use computer from the XML request;
    determining a hardware identifier uniquely identifying the metered-use computer from the XML request;
    determining whether the request is a child request in a batch request associated with a plurality of metered-use computers;
    maintaining a local cache of a remote database and updating the local cache responsive to a SQL notification that the remote database has changed;
    processing the XML request using the local cache of the remote database to generate a response;
    storing and maintaining a record comprising the request identifier, the partner identifier, the hardware identifier, a batch status, and the response;
    sending the response to the metered-use computer.

2. The computer-readable storage medium of claim 1, further comprising receiving and storing reason metadata when the request is from a customer service entity.

* * * * *